(12) United States Patent
Feyh et al.

(10) Patent No.: US 10,502,595 B2
(45) Date of Patent: Dec. 10, 2019

(54) SENSOR DEVICE

(71) Applicant: Robert Bosch GmbH, Stuttgart (DE)

(72) Inventors: Ando Feyh, Dettenhausen (DE); Ronny Schmid, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 15/544,217

(22) PCT Filed: Jan. 27, 2016

(86) PCT No.: PCT/EP2016/051628
§ 371 (c)(1),
(2) Date: Jul. 17, 2017

(87) PCT Pub. No.: WO2016/131618
PCT Pub. Date: Aug. 25, 2016

(65) Prior Publication Data
US 2018/0313674 A1 Nov. 1, 2018

(30) Foreign Application Priority Data
Feb. 17, 2015 (DE) .................. 10 2015 202 781

(51) Int. Cl.
G01D 11/24 (2006.01)
E01F 11/00 (2006.01)
G08G 1/02 (2006.01)

(52) U.S. Cl.
CPC ............ *G01D 11/245* (2013.01); *E01F 11/00* (2013.01); *G08G 1/02* (2013.01)

(58) Field of Classification Search
CPC ....... E01F 11/00; G01D 11/245; G01D 11/30; G01D 21/02; G08G 1/02; G08G 1/146
See application file for complete search history.

(56) References Cited

U.S. PATENT DOCUMENTS

| | | | | |
|---|---|---|---|---|
| 3,911,390 A | * | 10/1975 | Myers ..................... | E01F 11/00 340/940 |
| 5,206,642 A | * | 4/1993 | Gregoire .................. | G08G 1/02 174/110 A |
| 5,239,148 A | * | 8/1993 | Reed ........................ | G08G 1/02 200/86 A |

(Continued)

FOREIGN PATENT DOCUMENTS

| CN | 2517631 Y | 10/2002 |
|---|---|---|
| CN | 201438327 U | 4/2010 |

(Continued)

OTHER PUBLICATIONS

International Search Report dated Mar. 18, 2016, of the corresponding International Application PCT/EP2016/051628 filed Jan. 27, 2016.

*Primary Examiner* — Francis C Gray
(74) *Attorney, Agent, or Firm* — Norton Rose Fulbright US LLP; Gerard Messina

(57) ABSTRACT

A sensor device, including a sensor casing, inside of which one sensor or multiple sensors is/are situated, a holder for fastening the sensor casing to a traffic infrastructure, a processor being situated in the sensor casing, which is designed to detect, based on sensor data from one or multiple of the one sensor or of the multiple sensors, an impermissible application of force on the sensor casing.

14 Claims, 1 Drawing Sheet

(56) References Cited

U.S. PATENT DOCUMENTS

| | | | |
|---|---|---|---|
| 5,710,558 A * | 1/1998 | Gibson | G08G 1/02 200/85 R |
| 2012/0007749 A1 * | 1/2012 | Oldknow | G08G 1/017 340/933 |
| 2012/0293339 A1 | 11/2012 | Milon et al. | |
| 2013/0063282 A1 * | 3/2013 | Baldwin | B61L 29/282 340/941 |
| 2013/0220033 A1 * | 8/2013 | Weston | G01L 1/04 73/862.625 |
| 2013/0271292 A1 * | 10/2013 | McDermott | G08G 1/096783 340/905 |
| 2014/0098631 A1 * | 4/2014 | Pichot | G01V 1/16 367/14 |
| 2016/0187183 A1 * | 6/2016 | Cornu | G01G 19/024 177/132 |
| 2017/0154617 A1 * | 6/2017 | Menoud | E01F 11/00 |
| 2018/0082134 A1 * | 3/2018 | Sivaraman | G06K 9/00355 |
| 2018/0266855 A1 * | 9/2018 | Sodan | E01F 11/00 |

FOREIGN PATENT DOCUMENTS

| | | | |
|---|---|---|---|
| CN | 101857008 A | 10/2010 | |
| CN | 201725438 U | 1/2011 | |
| CN | 201740537 U | 2/2011 | |
| CN | 202008744 U | 10/2011 | |
| CN | 203479827 U | 3/2014 | |
| CN | 104121935 A | 10/2014 | |
| EP | 0259523 A1 | 3/1988 | |
| EP | 1227452 A1 | 7/2002 | |
| FR | 2532601 A1 | 3/1984 | |
| JP | 2012003458 A | 1/2012 | |
| JP | 2014199540 A | 10/2014 | |
| WO | 9728519 A1 | 8/1997 | |
| WO | WO-9728519 A1 * | 8/1997 | G08B 13/10 |
| WO | 2006005208 A1 | 1/2006 | |
| WO | 2011011405 A2 | 1/2011 | |
| WO | 2014109540 A1 | 7/2014 | |

* cited by examiner

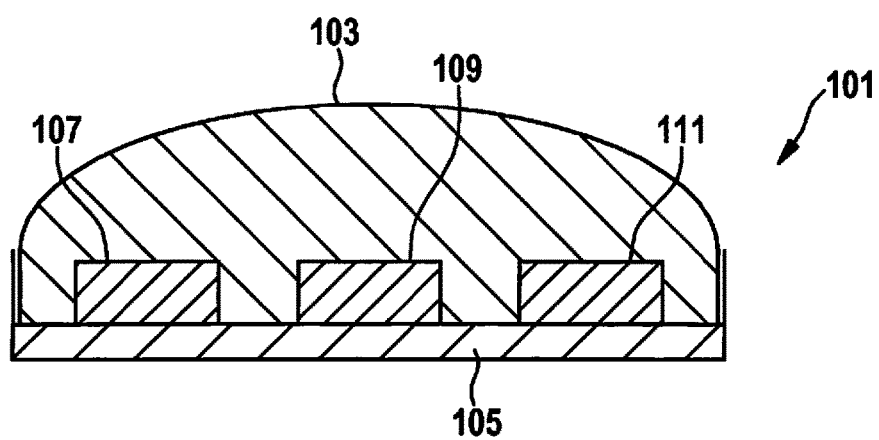

SENSOR DEVICE

FIELD

The present invention relates to a sensor device

BACKGROUND INFORMATION

Sensors as such are conventional. In general, sensors are fastened to an object and measure physical variables in a surroundings of the object. Thus, for example, traffic flow sensors fastened to a post on a road measure a traffic flow on the road.

For sensors, which are fastened to an object, there is the risk that they may be stolen or damaged.

SUMMARY

An object of the present invention includes efficiently enabling an impermissible application of force on a sensor casing to be detected.

Advantageous embodiments of the present invention are described herein.

According to one aspect of the present invention, a sensor device is provided, including:
  a sensor casing
  inside of which one sensor or multiple sensors are situated,
  a holder for fastening the sensor casing to a traffic infrastructure,
  a processor being situated in the sensor casing, which is designed to detect, based on sensor data from one or from multiple of the one sensor or multiple sensors, an impermissible application of force on the sensor casing.

Thus, the present invention includes, in particular, and among other things, detecting an impermissible application of force on the sensor casing by sensor data from one or from multiple of the one sensor or multiple sensors being evaluated and analyzed with the aid of the processor. This yields, in particular, the technical advantage that it may be efficiently recognized when a force acts on the sensor casing, which is not permissible, i.e., is impermissible. Thus, the sensor device itself may detect when it is affected by an impermissible application of force. This requires, therefore, no external monitoring systems, which may detect such an impermissible application of force. This also creates, in particular, an efficient, effective and cost-saving option for detecting an impermissible application of force on the sensor casing.

According to one specific embodiment, it is provided that the sensor device further includes a communication interface which, in the case of a detected impermissible application of force, is designed to transmit a message informing about the impermissible application of force. This yields, in particular, the advantage that persons and/or systems, which are located externally of the sensor device, may be informed about the impermissible application of force. These persons and/or systems may then particularly advantageously take appropriate measures.

According to one specific embodiment, it is provided that the sensor casing includes the communication interface.

According to one specific embodiment, it is provided that the holder includes the communication interface.

According to another specific embodiment, it is provided that both the holder as well as the sensor casing each includes a communication interface.

According to another specific embodiment, it is provided that the communication interface is designed, in case of a detected impermissible application of force, to transmit sensor data of the one sensor or of the multiple sensors. This yields, in particular, the technical advantage that persons and/or systems located externally of the sensor device are able to receive the sensor data and are thus able to evaluate these in an advantageous manner. Thus, for example, the impermissible application of force may be analyzed in greater detail even later.

Sensor data within the context of the present invention include, in particular, measurement data from measurements, which have been carried out with the aid of the one sensor or of the multiple sensors.

According to one specific embodiment, it is provided that the one sensor or the multiple sensors include a position sensor for detecting a position of the sensor casing, so that the sensor data of the detected position transmitted with the aid of the communication interface include position data corresponding to the detected position. This yields, in particular, the technical advantage that persons and/or systems located externally of the sensor device may be informed about a position of the sensor casing.

According to another specific embodiment, it is provided that the communication interface and/or the processor are designed, in the case of an impermissible application of force, to provide the message to be transmitted and/or the sensor data to be transmitted with a time stamp. This yields, in particular, the technical advantage that a point in time of the impermissible application of force and/or the sensor data to be transmitted may also be made known to persons and/or systems located externally of the sensor device. Thus, the time stamp marks, in particular, a point in time of the impermissible application of force.

According to another specific embodiment, it is provided that the message includes an activation instruction for a monitoring unit for monitoring the sensor device, so that the monitoring unit may be activated in response to the activation instruction in order to monitor the sensor device. This yields, in particular, the technical advantage that monitoring of the sensor device after the occurrence of an impermissible application of force may be carried out with the aid of this external monitoring unit. Thus, this means, for example, that the external monitoring unit does not have to be permanently activated or permanently switched on. The monitoring unit is activated or switched on only in response to an activation instruction. This advantageously ensures that the monitoring unit may be operated efficiently, in particular, in an energy-saving manner.

According to another specific embodiment, it is provided that the processor is designed to detect, based on the sensor data, a deviation of an actual state of the sensor casing from a setpoint state of the sensor casing, the processor being designed to detect an impermissible application of force on the sensor casing based on the detection of the deviation. This yields, in particular, the technical advantage that an efficient and simple detection of the impermissible application of force may be carried out.

According to another specific embodiment, it is provided that the processor is designed to define, based on the sensor data, an instantaneous actual state of the sensor casing as the setpoint state. This yields, in particular, the technical advantage that a known actual state, for example, during an initial installation of the sensor device, may be defined as the setpoint state.

A state of the sensor casing includes, in particular, a position and/or a location of the sensor casing. Thus, this means, for example, that the actual state is an actual location and/or an actual position of the sensor casing. Accordingly, the setpoint state is then, in particular, a setpoint position and/or a setpoint location. Thus, this means in particular, that according to one specific embodiment, a deviation of an actual location and/or actual position of the sensor casing from an actual location and/or actual position of the sensor casing is detected, the impermissible application of force then being detected accordingly.

An application of force on the sensor casing will generally result in a movement of the sensor casing. For example, the sensor casing is displaced from its mounting position by an impermissible application of force.

In another specific embodiment, it is provided that the processor is designed, in the case of a detected impermissible application of force on the sensor casing, to deactivate one or multiple of the one sensor or of the multiple sensors. This yields, in particular, the technical advantage that a thief can no longer use the sensor casing due to the deactivated sensors, at least only a limited use of the sensor casing is still possible. The processor is designed, in particular, in the case of a detected impermissible application of force on the sensor casing, to deactivate all sensors located inside the sensor casing. In particular, all sensors except for one position sensor are deactivated. This means, therefore, that at least one position of the sensor casing may still be sent via the communication interface. The deactivation is carried out, in particular, after a sending of the message.

According to one specific embodiment, the sending includes the sending of a corresponding message and/or corresponding sensor data over a communication network. A communication network includes, for example, a WLAN network and/or a mobile communications network. A communication over the communication network, in particular, becomes encrypted or is encrypted.

According to one specific embodiment, it is provided that the sensor casing is detachably fastened in the holder. This yields, in particular, the technical advantage that the sensor casing may be replaced without simultaneously replacing the holder. It is also advantageously ensured that the holder may still be fastened to the traffic infrastructure without the sensor casing. This may simplify a mounting or also a dismounting of the holder. Fastening the holder to or dismounting the holder from the traffic infrastructure may, in particular, prevent the sensor casing from being damaged, because the sensor casing may be removed from the holder for the purpose of mounting or dismounting. This is due to the detachable fastening.

This present invention also includes the advantage that a cost-efficient installation and deinstallation of the sensor device may be effectuated, because in this way, if the sensor device is intended to be situated only temporarily on a traffic infrastructure, only the sensor casing may be removed after a useful life, whereas the holder continues to remain fastened to the traffic infrastructure. This means, therefore, that the sensor casing may be subsequently used again on another holder. With the present invention, therefore, costs arise which are generally only related to the holder.

According to one specific embodiment, it is provided that the sensor casing and the holder are formed as a single piece. Thus, this means, in particular, that the holder and the sensor casing form a shared component.

According to another specific embodiment, it is provided that the holder is fastened to a traffic infrastructure.

According to one specific embodiment, it is provided that the sensor or the sensors include one or several of the following sensors: a surroundings sensor, a parking sensor for detecting an occupied state of a parking position, a traffic sensor for monitoring a traffic flow and/or for measuring a traffic volume and/or a storage sensor for monitoring a container occupancy and/or an environmental sensor, in particular, a gas sensor.

A surroundings sensor is, for example: an ultrasonic sensor, a LIDAR sensor, a laser sensor, a radar sensor or a video sensor.

A detection of a surroundings of the sensor casing is enabled, in particular, with the aid of such a surroundings sensor.

The parking sensor is constituted, for example, as a surroundings sensor.

The traffic sensor is constituted, for example, as a surroundings sensor.

The storage sensor is constituted, for example, as a surroundings sensor.

With the use of a parking sensor, it may be advantageously effectuated that an occupied state of a parking position, for example, of a parking position in a parking facility, may be detected. This means, therefore, that a parking sensor within the context of the present invention may detect whether a parking position is occupied or not occupied, i.e., is vacant. Such a sensor device is used according to one specific embodiment for monitoring an occupied state of a parking position.

Thus, when using a traffic sensor, the sensor device may be advantageously used for monitoring a traffic flow and/or for measuring a traffic volume, which is thus provided according to one specific embodiment.

When using a storage sensor, the sensor device may according to one specific embodiment be used for monitoring a container occupancy, which is thus provided according to one specific embodiment. This, for example, in a storage yard for containers.

According to another specific embodiment, it is provided that the traffic infrastructure includes a parking facility, inside of which the holder is attached, or includes a road, on which the holder is fastened, or includes a container storage yard, inside of which the holder is fastened.

Thus, this means, in particular, that the holder is fastened inside a parking facility. Such a parking facility is a traffic infrastructure. A parking facility within the context of the present invention may also be referred to as a parking area and serves as a storage area for vehicles. Thus, the parking facility forms, in particular, a cohesive area, which includes multiple parking spaces (in a parking facility on private property) or parking zones (in a parking facility on public property). The parking facility according to one specific embodiment may be encompassed by a parking garage. The parking facility is encompassed, in particular, by a garage. Thus, a parking position within the context of the present invention is, in particular, a parking space or a parking zone.

Thus, this also means, in particular, that the holder is situated or fastened, for example, to a ceiling, to a wall or to a column or on a parking area or on a parking zone of a parking facility, for example, of a garage.

In another specific embodiment, the traffic infrastructure includes a fixed or stationary object, which is situated on a road. It may be a road sign, a light signal system, a bridge or a tunnel.

Thus, this means, in particular, that the holder may be situated or is situated, for example, on a bridge, on a tunnel, on a light signal system, on a street light, on a traffic sign. The sensor device may then be efficiently used for monitoring the traffic flow and/or for measuring a traffic volume.

The holder is situated, for example, inside a storage facility. For example, the holder is situated at a container storage yard.

According to one specific embodiment, it is provided that the sensor or the sensors, on the basis of which the processor may detect an impermissible application of force on the sensor casing, include one or multiple of the following sensors: motion sensor, acceleration sensor, position sensor, rotation rate sensor and magnetic sensor.

A motion sensor is designed, in particular, to detect a movement of the sensor casing. Thus, this means, in particular, that a movement of the sensor casing is detected or may be detected with the aid of the motion sensor.

An acceleration sensor is designed, in particular, to detect an acceleration of the sensor casing. Thus, an acceleration of the sensor casing may be advantageously detected.

A position sensor is designed, in particular, to detect a location of the sensor casing. Thus, a location of the sensor casing may be advantageously detected.

A rotation rate sensor is designed, in particular, to detect a rotation rate of the sensor casing. Thus, it may be detected, for example, when the sensor casing rotates.

A magnetic sensor (also called magnetic field sensor) is designed, in particular, to detect a magnetic field. A magnet may, for example, be situated in the holder. If the sensor casing is then removed from the holder, the magnetic sensor will measure a weaker magnetic field or no magnetic field at all. Thus, it may be advantageously detected when the sensor casing is removed from the holder.

Thus, the present invention includes, in particular, and among other things, detecting a movement and/or a position change of the sensor casing with the aid of at least one of the aforementioned sensors, thus, in particular, with the aid of a motion sensor and/or of an acceleration sensor and/or of a position sensor and/or of a rotation rate sensor and/or of a magnetic sensor, because an application of force on the sensor casing generally results in a movement and/or acceleration and/or position change and/or a rotation rate. This may therefore be detected with the aid of the aforementioned sensors.

To ascertain whether a detected application of force is permissible or not, it is provided according to one specific embodiment that one measured variable or multiple measured variables detected or measured with the aid of the aforementioned sensors are compared with corresponding threshold values, the application of force being classified as permissible or impermissible as a function of the comparison. Thus, the processor according to one specific embodiment is designed to carry out this comparison and this classification.

Thus, for example, a detected application of force is impermissible if a detected or measured rotation rate is greater or greater equal to a predetermined rotation rate threshold value.

Thus, for example, a detected application of force is impermissible if a detected or measured acceleration is greater or greater equal to a predetermined acceleration threshold value.

Thus, for example, a detected application of force is impermissible if a detected or measured position change is greater or greater equal to a predetermined position change threshold value.

Thus, for example, a detected application of force is impermissible if a detected or measured magnetic field is smaller or smaller equal to a predetermined magnetic field threshold value.

According to one specific embodiment, it is provided that the holder includes solely one fastening functionality. This yields, in particular, the technical advantage that a technically simple and cost-efficient holder may be used, because the holder need only include one fastening functionality. Thus, the fact that the holder includes only one fastening functionality means, in particular, that the holder is used and is appropriately designed only for fastening the sensor casing to the traffic infrastructure. Thus, the holder has no task other than a fastening task.

In one specific embodiment alternative to this, it is provided that in addition to the fastening functionality, the holder also includes one or multiple additional functionalities. This yields, in particular, the technical advantage that an efficient and effective utilization of the holder may be effectuated, because even though only one component is provided, this component has multiple functions.

In another specific embodiment, it is provided that the holder includes a communication interface, which is designed to send sensor data of the sensor or sensors over a communication network, so that the holder includes as an additional functionality a communication functionality. This yields, in particular, the technical advantage that the sensor data may be sent over a communication network, for example to users of the communication network. Thus, the sensor data may also be provided and, if necessary, analyzed remotely of the sensor device.

According to one specific embodiment, it is provided that the sensor casing includes a communication interface, which is designed to send sensor data of the sensor or of the sensors over a communication network. Thus, this means, in particular, that the sensor casing includes a communication functionality. This also yields, in particular, the technical advantage that the sensor data may be provided to users of the communication network.

In another specific embodiment, it is provided that the communication interface of the sensor casing is designed to send the sensor data of the sensor or of the sensors to the communication interface of the holder. This takes place, for example, over a communication network. Accordingly, the communication interface of the holder is designed, in particular, to receive these sensor data of the sensor or of the sensors from the communication interface of the sensor casing.

Thus, this means, in particular, that according to one specific embodiment, it is provided that a communication link is formed between the holder and the sensor casing. This takes place, in particular, when the sensor casing is detachably fastened in the holder. The communication link includes, in particular, a wireless communication link and/or a hard-wired communication link. The communication interfaces of the sensor casing and of the holder are designed accordingly.

According to one specific embodiment, the wired communication link is formed with the aid of electrical contacts.

According to one specific embodiment, a wireless communication link is formed with the aid of a coil. The wireless communication link includes, for example, a NFC communication link. Here, "NFC" refers to "Near Field Communication".

According to one specific embodiment, it is provided that the wireless communication link includes an optical communication link. An optical communication link may be formed, for example, with the aid of LEDs. Here, LED stands for "light emitting diode".

Thus, this means, in particular, that according to one specific embodiment, the communication interface is designed to receive the sensor data from the sensor or from the sensors with the aid of an optical communication link. Thus, this means, in particular, that the sensor data are transmitted optically from the sensor casing to the holder. The sensor casing includes, for example, one LED or multiple LEDs for transmitting sensor data to the holder.

In another specific embodiment, it is provided that the holder includes an electrical energy store for supplying the sensor or the sensors with electrical energy, so that the holder includes as an additional functionality an energy supply functionality. This yields, in particular, the technical advantage that the sensors or the sensor may be supplied with electrical energy. As a result, a separate electrical energy store in the sensor casing may be dispensed with, for example. If, however, such an electrical energy store should be present in the sensor casing, the electrical energy store of the holder may be used as a redundant electrical energy store. In this way, a redundancy relating to an electrical power supply of the sensor or of the sensors is thus created.

In another specific embodiment, it is provided that the holder includes a data memory for storing sensor data of the sensor or of the sensors. This yields, in particular, the technical advantage that the sensor data may be stored, so that, for example, they may still be provided at a later point in time. A data memory includes, in particular, a volatile and/or non-volatile data memory.

In another specific embodiment, it is provided that the holder includes a data memory for storing sensor data of the sensor or of the sensors and an electrical energy store for buffering the sensor data stored in the data memory, so that the holder includes as additional functionalities a sensor data storage functionality and a sensor data buffer functionality. This yields, in particular, the technical advantage that the sensor data may also still be provided at a later point in time. Due to the sensor data buffer functionality, the data are maintained, for example, even in the case of a failure of a primary power supply, for example, by the energy store of the sensor casing.

In another specific embodiment, it is provided that the holder includes a detection unit, which is designed to detect a number of sensor casing replacement cycles, so that the holder includes a sensor casing replacement cycle tracking functionality as an additional functionality. This yields, in particular, the technical advantage that it may be tracked how often the sensor casing has already been replaced.

In another specific embodiment, it is provided that the holder includes a processor, which is designed to program the sensor or the sensors, so that the holder includes as an additional functionality a sensor programming functionality. This yields, in particular, the technical advantage that the sensor or the sensors may be programmed. Thus, for example, the processor may write or flash a new firmware into the sensor or into the sensors. In this way, a sensor may be readjusted, for example. Potential errors, which have occurred in the sensor or in the sensors during the manufacture of the sensor or of the sensors may thus be subsequently corrected via software, if necessary.

In another specific embodiment, it is provided that the detachable fastening is formed with the aid of a bayonet fitting and/or with the aid of a screw connection and/or with the aid of a catch mechanism and/or with the aid of a clip connection and/or with the aid of an adhesive bond and/or with the aid of an insertion of the sensor casing into the holder. The aforementioned fastening types yield, in particular, the technical advantage of enabling an efficient, detachable fastening of the sensor casing to the holder.

According to one specific embodiment, the sensor casing includes a memory, in particular, an electronic and/or magnetic memory. Such a memory is, in particular, a data memory for the sensor data.

According to one specific embodiment, the sensor casing includes a microcontroller for controlling the sensor or the sensors.

According to one specific embodiment, the sensor casing includes a switch for switching the sensor or the sensors on or off, i.e., an on/off switch.

According to one specific embodiment, the sensor casing includes an operating element or multiple operating elements for operating the sensor or the sensors.

According to one specific embodiment, the sensor casing includes an electrical energy store for the electrical power supply of the sensor or of the sensors and, if necessary, of additional electronic components situated inside the sensor casing such as, for example, a memory and/or a microcontroller.

According to one specific embodiment, the sensor casing meets the requirements of a predetermined protection class according to the known IP codes. The abbreviation "IP" in this case stands for "International Protection". For the encoding of the IP codes, there is, for example, the DIN EN 60529 or the VDE 0470-1 or the DIN 40050 Part 9. Thus, this means, in particular, that the sensor casing encapsulates, and therefore protects the elements situated inside it against external influences.

The present invention is explained in greater detail below with reference to preferred exemplary embodiments.

BRIEF DESCRIPTION OF THE DRAWING

FIG. 1 shows a sensor device.

DETAILED DESCRIPTION OF EXAMPLE EMBODIMENTS

FIG. 1 shows a sensor device 101.

Sensor device 101 includes a sensor casing 103 and a holder 105 for fastening sensor casing 103 to a traffic infrastructure.

Sensor casing 103 is detachably fastened in holder 105. This means therefore, that sensor casing 103 and holder 105 are components formed separately from one another.

In one specific embodiment not shown, it is provided that sensor casing 103 and holder 105 together form a component, i.e. are integrally formed.

A sensor 107, which is a surroundings sensor, for example, is situated in sensor casing 103. Sensor 107, for example, is a parking sensor for detecting an occupied state of a parking position.

Also situated inside sensor casing 103 is an acceleration sensor 109. It is possible with the aid of acceleration sensor 109 to measure or to detect an acceleration of sensor casing 103. Such an acceleration may occur, for example, when sensor casing 103 is removed from its holder 105. Such an acceleration may occur, for example, if an external force acts on sensor casing 103. Such an acceleration may result, for example, if sensor casing 103 is struck.

A processor 111 is also situated inside sensor casing 103. Processor 111 is designed to detect, based on the sensor data of acceleration sensor 109, an impermissible application of force on sensor casing 103. Thus, this means, in particular, that processor 111 is designed to analyze or evaluate the acceleration data corresponding to a measured acceleration of acceleration sensor 109 in order to detect the impermissible application of force on sensor casing 103. An acceleration threshold value is provided, for example, below which a measured acceleration is still classified as an admissible acceleration. This means, therefore, that the force resulting in this acceleration is still classified as an admissible force. Above the acceleration threshold value, it is provided that the measured acceleration is classified as an impermissible acceleration. Accordingly, the force resulting in this acceleration is an impermissible force. In this case, therefore, an impermissible application of force took place on sensor casing 103.

In one specific embodiment not shown, it is provided that in addition to or instead of acceleration sensor 109, at least one or multiple of the following sensors are provided: motion sensor, position sensor, rotation rate sensor and magnetic sensor. Accordingly, processor 111 is then designed to evaluate the sensor data of each of the sensors as to whether an impermissible application of force is acting on or has taken place on sensor casing 103. This is evaluated, in particular, with the aid of a comparison of the sensor data with a threshold value, i.e., for example, with a motion threshold value, position change threshold value, rotation rate threshold value, magnetic field threshold value.

Thus, it is advantageously enabled, for example, to detect a position change or location change of sensor casing 103. In particular, a setpoint state, i.e., for example, a setpoint position or a setpoint location of sensor casing 103 is defined. Processor 111 is designed, in particular, based on the sensor data of each of the sensors, to detect an actual state of sensor casing 103, for example, an actual position or an actual location. Accordingly, processor 111 may then accordingly ascertain a deviation of this actual state from the setpoint state and classify the ascertained deviation as permissible or impermissible.

In one specific embodiment not shown, it is provided that in addition to or instead of sensor 107, still other sensors may be provided. For example, additional surroundings sensors are provided. In particular, a gas sensor is provided.

Thus, for example, an occupied state of a parking position may be detected with the aid of sensor device 101. A traffic flow and/or a traffic volume, in particular, may be measured with the aid of sensor device 101. A gas concentration in the surroundings of sensor device 101, in particular, may be detected or measured with the aid of sensor device 101.

In one specific embodiment not shown, at least one of the following elements is also situated inside sensor casing 103: electrical energy store, microcontroller, data memory, communication interface.

Thus, the present invention includes, in particular, and among other things, for example, detecting an undesirable external influence on the sensor device. Such a detected undesirable external influence, i.e., in general the impermissible application of force, may be reported to an operator of the sensor device, for example. This may be achieved, in particular, in that in the case of a detected impermissible application of force, a message informing about the impermissible application of force is transmitted with the aid of a communication interface.

In one specific embodiment not shown, it is provided that upon recognition of the external influence and/or of a theft, i.e., in general, of an impermissible application of force, one sensor or several of the sensors situated inside the sensor casing are deactivated. Deactivation occurs, in particular, before a transmission of a message, in particular, before a transmission of the message to a system center and/or to an operator, or only after a transmission of the message.

The following effects, in particular, may be achieved with the aid of the present invention: deterrence, safety, operational reliability, effective investment protection and, therefore, a sustainable functional capacity of the sensor device.

Thus, in accordance with the present invention, an additional sensor element is introduced into the sensor casing because, in addition to the main function of the sensor device, this sensor is intended to detect an improper movement and a position change of the sensor casing. Thus, this additional sensor element is, in particular, a sensor, for example, a motion sensor, an acceleration sensor, a position sensor, a rotation rate sensor or a magnetic sensor. Multiple additional sensor elements, in particular, are provided.

Thus, the additional sensor element includes, in particular, sensors for position detection and/or movement detection, in particular, an acceleration sensor and/or a rotation rate sensor and/or a magnetic sensor.

Thus, according to one specific embodiment, it is provided that a position deviation of the sensor casing from an original installation position (such a position deviation corresponds, for example, to an improper removal) or an external shock effect (this corresponds, for example, to vandalism) or a movement detection (this corresponds, for example, to an improper removal) are detected with the aid of the additional sensor element or of the additional sensor elements, i.e., with the aid of the aforementioned sensors.

This detected position deviation and/or external shock effect and/or movement detection is transmitted according to one specific embodiment with the aid of a communication interface, for example, to an operator of the sensor device. This means, therefore, that the operator is informed via an existing wireless connectivity (in this case, communication interface) provided by the sensor casing that a position deviation and/or an external shock effect and/or a movement detection has taken place.

According to one specific embodiment, it is provided that additional data such as, for example, position data and/or a time stamp, which are detected by or stored in the sensors of the sensor casing, are communicated or transmitted with the aid of the communication interface if needed.

According to one specific embodiment, it is provided that an external monitoring unit for monitoring the sensor device is activated in response to a receipt of these data and/or of the message. This means, therefore, that a camera present in an environs, for example, a parking garage, for monitoring purposes may be activated or is activated as a result.

According to one specific embodiment, the external monitoring unit includes one or multiple surroundings sensors. These surroundings sensors may, for example, be one of the aforementioned surroundings sensors.

According to one specific embodiment, an automated service technician call is provided, for example, in response to a receipt of the message and/or of the data. Thus, this means, in particular, that a service technician is automatically called.

According to one specific embodiment, a correct position (setpoint position) of the sensor casing (in general, a correct state, i.e., a setpoint state) is programmed in during an initial installation of the sensor casing, together with a configuration of the additional operating parameters.

The present invention also provides, in particular, sensor devices designed as a single piece. A single-piece sensor device refers to a sensor device, in which the sensor casing and the holder are formed together as a component.

The present invention may be applied, in particular, to parking sensors for a parking facility management. The present invention may be applied, in particular, to sensors for measuring and/or monitoring a traffic flow and/or a traffic volume. The present invention may be used, in particular, for sensors for monitoring a container space occupancy and/or for monitoring in a container storage yard. The present invention may be applied, in particular, to environmental sensors inside and/or outside buildings. An environmental sensor is a gas sensor, for example.

What is claimed is:

1. A sensor device, comprising:
a sensor casing;
at least one sensor situated in the sensor casing;
a holder for fastening the sensor casing to a traffic infrastructure; and
a processor, situated in the sensor casing, designed to detect, based on sensor data from at least one of the at least one sensor, an impermissible application of force on the sensor casing,
wherein the traffic infrastructure includes a fixed or stationary object situated on a road sign, a light signal system, a bridge or a tunnel.

2. The sensor device as recited in claim 1, further comprising:
a communication interface which is designed to, in the case of a detected impermissible application of force, transmit a message informing about the impermissible application of force.

3. The sensor device as recited in claim 2, wherein the communication interface is designed to, in the case of a detected impermissible application of force, transmit sensor data of the at least one sensor.

4. The sensor device as recited in claim 3, wherein the at least one sensor includes a position sensor for detecting a position of the sensor casing, so that the sensor data of the detected position transmitted with the aid of the communication interface include corresponding position data.

5. A sensor device, comprising:
a sensor casing;
at least one sensor situated in the sensor casing;
a holder for fastening the sensor casing to a traffic infrastructure;
a processor, situated in the sensor casing, designed to detect, based on sensor data from at least one of the at least one sensor, an impermissible application of force on the sensor casing; and
a communication interface which is designed to, in the case of a detected impermissible application of force, transmit a message informing about the impermissible application of force,
wherein at least one of the communication interface and the processor is designed, in the case of an impermissible application of force, to provide at least one of the message to be transmitted and the sensor data to be transmitted, with a time stamp.

6. A sensor device, comprising:
a sensor casing;
at least one sensor situated in the sensor casing;
a holder for fastening the sensor casing to a traffic infrastructure;
a processor, situated in the sensor casing, designed to detect, based on sensor data from at least one of the at least one sensor, an impermissible application of force on the sensor casing; and
a communication interface which is designed to, in the case of a detected impermissible application of force, transmit a message informing about the impermissible application of force,
wherein the message includes an activation instruction for a monitoring unit for monitoring the sensor device so that the monitoring unit may be activated in response to the activation instruction in order to monitor the sensor device.

7. The sensor device as recited in claim 1, wherein the processor is designed to detect, based on the sensor data, a deviation of an actual state of the sensor casing from a setpoint state of the sensor casing, the processor being designed to detect an impermissible application of force on the sensor casing based on the detection of the deviation.

8. A sensor device, comprising:
a sensor casing;
at least one sensor situated in the sensor casing;
a holder for fastening the sensor casing to a traffic infrastructure; and
a processor, situated in the sensor casing, designed to detect, based on sensor data from at least one of the at least one sensor, an impermissible application of force on the sensor casing,
wherein the processor is designed to detect, based on the sensor data, a deviation of an actual state of the sensor casing from a setpoint state of the sensor casing, the processor being designed to detect an impermissible application of force on the sensor casing based on the detection of the deviation,
wherein the processor is designed to define, based on the sensor data, an instantaneous actual state of the sensor casing as the setpoint state.

9. A sensor device, comprising:
a sensor casing;
at least one sensor situated in the sensor casing;
a holder for fastening the sensor casing to a traffic infrastructure; and
a processor, situated in the sensor casing, designed to detect, based on sensor data from at least one of the at least one sensor, an impermissible application of force on the sensor casing,
wherein the processor is designed to, in the case of a detected impermissible application of force on the sensor casing, deactivate at least one of the at least one sensor.

10. The sensor device as recited in claim 1, wherein the sensor casing is detachably fastened in the holder.

11. The sensor device as recited in claim 1, wherein the sensor casing and the holder are formed as a single piece.

12. The sensor device as recited in claim 1, wherein the holder is fastened to a traffic infrastructure.

13. The sensor device as recited in claim 1, wherein the at least one sensor includes at least one of the following sensors: a surroundings sensor, a parking sensor for detecting an occupied state of a parking position, a traffic sensor for monitoring a traffic flow, a traffic sensor for measuring a traffic volume, a storage sensor for monitoring a container occupancy, an environmental sensor, and a gas sensor.

14. The sensor device as recited in claim 1, wherein the at least one sensor includes at least one sensor, on the basis of which the processor may detect an impermissible application of force on the sensor casing, includes at least one of the following sensors: a motion sensor, an acceleration sensor, a position sensor, a rotation rate sensor, and a magnetic sensor.

* * * * *